Nov. 8, 1932.   C. LORBER   1,887,162
METHOD AND MEANS FOR PACKAGING BISCUIT DOUGH
Filed Jan. 25, 1932

Inventor
Charles Lorber
By [signature]
Attorney

Patented Nov. 8, 1932

1,887,162

UNITED STATES PATENT OFFICE

CHARLES LORBER, OF LOUISVILLE, KENTUCKY

METHOD AND MEANS FOR PACKAGING BISCUIT DOUGH

Application filed January 25, 1932. Serial No. 588,776.

This invention relates to packing and storing and has special reference to a method of and means for packing uncooked biscuit dough and the like.

One important object of the invention is to provide an improved method of packing portions of biscuit dough and the like in such manner that the gaseous content of the dough will be, to a considerable extent, held occluded in the dough so that, when the cooking operation is performed, the dough will rise greatly and thereby cause the biscuit to be very light and palatable.

A second important object of the invention is to provide an improved general construction of a package or carton for biscuit dough and the like wherein the dough will be hermetically sealed so that a portion of the gases developed during the first rising or fermentation will be retained and held in the dough portions.

A third important object of the invention is to provide a novel package for this purpose having a body of paper like material and metallic ends arranged to grip the edge of the body and hermetically seal the same.

A fourth important object of the invention is to provide an improved carton for this purpose having a readily removable top but which shall be hermetically sealed.

With the above and other objects in view as will be hereinafter apparent, the invention consists in general of certain novel details of construction and combinations of parts hereinafter fully described, illustrated in the accompanying drawing and specifically claimed.

In the accompanying drawing like characters of reference indicate like parts in the several views, and Figure 1 is a view partly in section and partly in elevation showing the improved package or carton before the closure has been applied to the upper end, the view also illustrating the first step of the method.

Figure 5 is a perspective view, partly broken away, showing the screw cap used in the form shown in Figure 4.

Figure 2:
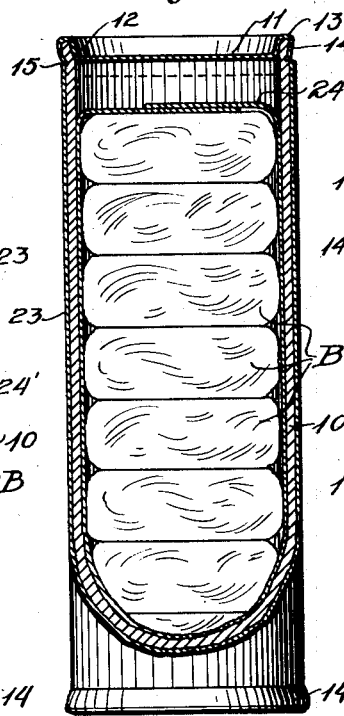
Figure 2 is a similar view showing the carton with the upper end closed and also illustrating the second step in the method.
Figure 3:
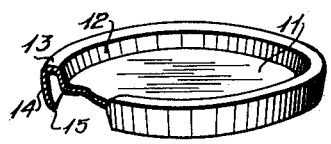
Figure 3 is a perspective view of one of the end closures used in this form of the invention, the view being partly broken away to show a portion of the cap in section.

In each embodiment of the invention, as here shown, the body of the carton consists of a tube 10 of pasteboard or other similar material and the lower end of this tube is closed by a metallic cap of the type shown in Figure 3. This type of cap is also used to close the upper end of the form shown in Figures 1 and 2. This cap consists of a central disc portion 11 having an upstanding and outwardly flaring peripheral rim or wall 12. The disc portion 11 is of the same diameter as the interior of the tube 10 so that, upon insertion of the disc in the end of the tube, the wall 12 forces the rim portion of the tube outwardly and makes a very tight fit therein. Moreover, the metal of the closure is continued outwardly as at 13 from the upper edge of the wall 12 and is then continued downwardly and inwardly as at 14 to extend parallel to the wall 12 and slightly below the disc portion 11, the edge 15 of this portion being curved inwardly to bite into the tube 10 as clearly shown in Figure 2. Thus, the edge of the tube is so gripped by the cap or closure as to make a hermetic or air tight joint. Since this cap or closure is imperforate there is no escape for any gases which may be generated in the carton.

Figure 4:
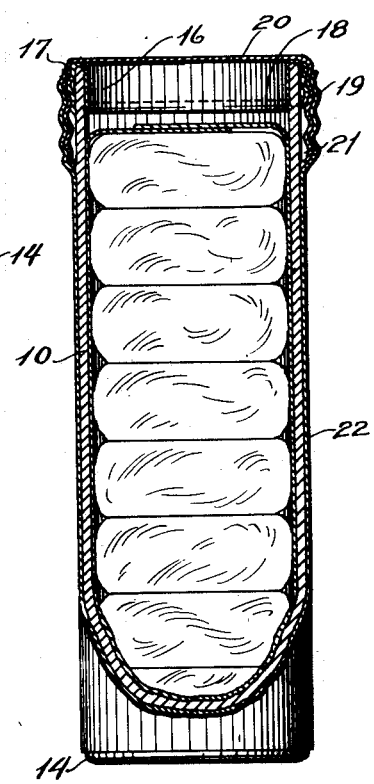
Figure 4 is a view similar to Figure 2 but showing a modified form of the carton.
Figure 5:
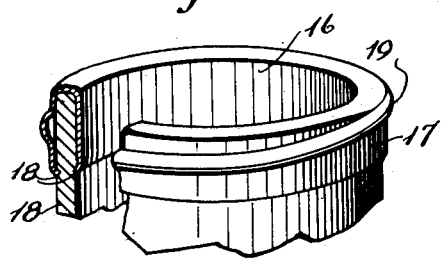
Figure 5 is a perspective view, partly broken away, illustrating the upper part of the carton of Figure 4 but with the screw cap used therein omitted.
Figure 6:

In the form of the invention shown in Figures 4, 5 and 6 the upper cap is replaced by a screw cap device. This device includes a metallic channel member fitting over the rim of the tube 10 and having an inner wall 16 and an outer wall 17 both of which have their edges crimped into the material of the tube 10 as shown at 18. The outer wall is pressed or otherwise shaped to provide a screw thread 19. On this end is fitted a cap having a disc-like body 20 provided with a peripheral screw threaded flange 21 of considerably greater height than the wall 17 so that, when the cap is screwed down as far as it will go, the flange 21 projects below the wall 17 and is covered by the outer wrapper or label sheet 22 which thus assists in forming a hermetic joint at this place.

A wrapper or label 23 is also used on the first form.

Figure 1:
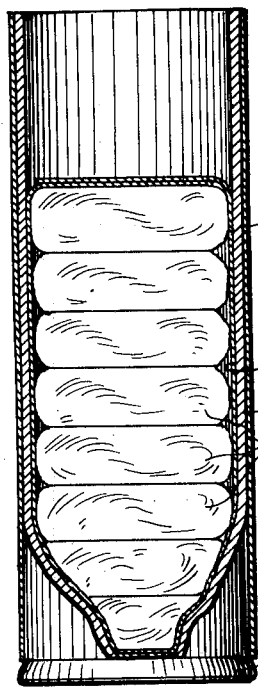

In carrying out my method of packing the uncooked biscuits B are stacked and wrapped in a suitable non-adhesive wrapper 24 and then placed in the container or carton as in Figure 1. The wrapper 24 prevents the oil of the lard employed in the biscuits from being absorbed by the pasteboard container and also makes it easy to remove the biscuits from the container or carton when the latter is opened.

The biscuits are kept from adhering by applying a thin coating of a liquid shortening such as melted lard, or they can be kept from sticking by dry flour but I prefer the former.

The biscuits are placed in the carton before they have risen. They are then allowed to partially rise as in Figure 2 whereupon the upper cap is applied. Up to this time excess gases have been allowed to escape. After sealing the carton the biscuits will continue to rise to about the dotted line 26 thus compressing the excess gases in the small space left and causing the gases developed in the final rising to be principally retained by the biscuits. Under these conditions it is obvious that when the carton is opened, as by cutting in the first form or unscrewing the cap in the second form, and the biscuits are cooked they will rise to a great extent and thus be very light and palatable.

There has thus been provided a simple and efficient method of and means for packaging uncooked biscuits and the like.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. That method of packaging uncooked biscuits which consists in stacking the biscuits in a carton having its upper end open to the air before the biscuits have risen, the stacked biscuits being of considerably less height than the carton, permitting the biscuits to partially rise in the carton, hermetically closing the upper end of the carton before the biscuits have risen to the top thereof, and permitting further rising of the biscuits in the carton.

2. That method of packaging uncooked biscuits which consists in wrapping a stack of uncooked and unrisen buscuits in a non-adhesive wrapper, placing the stack in a tubular carton of greater length than said stack with the upper end of the carton open, permitting the biscuits to rise in said carton to a desired degree, hermetically sealing the open end of the carton, and permitting the biscuits to rise within the sealed carton.

3. That method of packaging uncooked biscuits which consists in placing the biscuits before rising in a carton arranged to provide an air space above the biscuits open to the outer air, permitting the biscuits to partially rise in the carton to partially fill the space above them, hermetically sealing said space before the biscuits have completely risen, and permitting the biscuits to complete their rising.

In testimony whereof I affix my signature.

CHARLES LORBER.